(12) United States Patent
Deavours et al.

(10) Patent No.: US 7,505,001 B2
(45) Date of Patent: Mar. 17, 2009

(54) VIRTUAL SHORT CIRCUIT FOR PROVIDING REFERENCE SIGNAL IN RFID TAG

(75) Inventors: Daniel D. Deavours, Lawrence, KS (US); Karthik Narayanan Moncombu Ramakrishnan, San Diego, CA (US)

(73) Assignee: The University of Kansas, Lawrence, KS (US)

( * ) Notice: Subject to any disclaimer, the term of this patent is extended or adjusted under 35 U.S.C. 154(b) by 250 days.

(21) Appl. No.: 11/610,873

(22) Filed: Dec. 14, 2006

(65) Prior Publication Data

US 2007/0195003 A1 Aug. 23, 2007

Related U.S. Application Data

(60) Provisional application No. 60/750,182, filed on Dec. 14, 2005.

(51) Int. Cl.
*H01Q 1/38* (2006.01)
*G08B 13/14* (2006.01)

(52) U.S. Cl. .............. 343/700 MS; 343/850; 340/572.7

(58) Field of Classification Search ............. 340/572.7, 340/572.8; 343/700 MS, 850, 860
See application file for complete search history.

(56) References Cited

U.S. PATENT DOCUMENTS

| | | | |
|---|---|---|---|
| 5,300,936 A | 4/1994 | Izadian | |
| 5,406,298 A | 4/1995 | Walters | |
| 6,118,379 A * | 9/2000 | Kodukula et al. | 340/572.8 |
| 6,215,402 B1 | 4/2001 | Kodukula | |
| 6,320,509 B1 | 11/2001 | Brady | |
| 6,329,915 B1 | 12/2001 | Brady | |
| 6,366,260 B1 * | 4/2002 | Carrender | 343/866 |
| 6,441,740 B1 * | 8/2002 | Brady et al. | 340/572.7 |
| 6,806,831 B2 | 10/2004 | Johansson | |
| 6,839,028 B2 | 1/2005 | Lee | |
| 6,929,412 B1 | 8/2005 | Barrus | |
| 6,963,317 B2 | 11/2005 | Zuk | |
| 6,975,834 B1 | 12/2005 | Forster | |
| 7,298,273 B2 * | 11/2007 | Baba | 340/572.7 |
| 7,400,298 B2 * | 7/2008 | Fogg et al. | 343/700 MS |
| 2001/0048361 A1 | 12/2001 | Mays | |
| 2003/0058180 A1 | 3/2003 | Forester | |
| 2005/0024287 A1 | 2/2005 | Jo | |
| 2005/0088354 A1 | 4/2005 | Chang | |

(Continued)

OTHER PUBLICATIONS

Constatine A. Balanis, "Linear Wire Antennas", Antenna Theory: Analysis Design, Third Edition, 2005, pp. 151-214; John Wiley & Sons, Inc.

(Continued)

*Primary Examiner*—Tan Ho
(74) *Attorney, Agent, or Firm*—Spencer Fane Britt & Browne LLP

(57) ABSTRACT

An RFID tag (10) including a virtual short circuit using a stepped impedance transformation from an open circuit or other known impedance point to provide a reference signal to an integrated circuit (22). The stepped impedance transformer (28) does not consist solely of a quarter wavelength transmission line. The stepped impedance transformer (28) may consist of first and second transmission lines (30,32) having different lengths and widths. The RFID tag (10) may also include an impedance matching circuit (20) which does not consist solely of a three-section transmission line. The matching circuit (20) may include a shorting stub transmission line.

22 Claims, 4 Drawing Sheets

U.S. PATENT DOCUMENTS

2005/0243005 A1    11/2005    Raf

OTHER PUBLICATIONS

"ECCOPAD Application Note", Emerson & Cuming Microwave Products, Feb. 15, 2006.

Daniel D. Deavours, A Performance Analysis of Commercially Available UHF RFID Tags Based on EPCglobal's Class 0 and Class 1 Specifications,: Report 1, RFID Alliance Lab, Lawrence, KS, Dec. 2004.

Daniel D. Deavours, "UHF EPC Tag Performance Evaluation," Report 2, RFID Alliance Lab, Lawrence, KS, May 2005.

"ECCOPAD Isolators for Read on Metal RFID" Emerson & Cuming Microwave Products, brochure Aug. 2006.

C.A.Diugwu, J.C. Batchelor, R.J. Langley, and M. Fogg, "Planar Antenna for Passive Radio Frequency Identification (RFID) Tags", 7th AFRICON Conference in Africa (AFRICON 2004) (Gaborne, Botswana), vol. 1, pp. 21-24. Sep. 2004.

Leena Ukkonen, Lauri Sydanheimo, Markku Kivikoski, "A Novel Tag Design Using Inverted-F Antenna for Radio Frequency Identification of Metallic Objects," Proc. IEEE Sarnoff Symposium on Advances in Wired and Wireless Communication (Princeton, NJ), pp. 91-94, 2004.

M. Hirvonen, P. Pursula, K. Jaakkola, & K. Laukkanen, Planar Inverted-F Antenna for Radio Frequency Identification:, IEEE Electronics Letters, vol. 40, No. 14, pp. 848-850.

Leena Ukkonen, Lauri Sydanheimo, Markku Kivikoshi, "Effect of Metallic Plate Size on the Performance of Microstrip Patch-Type Tag Antennas for Passive RFID," IEEE Antenna and Wireless Propagation Letters, vol. 4, pp. 410-413, 2005.

Leena Ukkonen, Marijke Schaffrath, Daniel W. Engels, Lauri Sydanheimo, and Markku Kivikoski, Operability of Folded Microstrip Patch-Type Tag Antenna in the UHF RFID Bands within 865-928 MHz; Apr. 2006.

ECCOPAD UHF 915 MHz Isolator RFID Tags on Metal, Emerson & Cuming Microwave Products, Randolph,, MA, revision Aug. 4, 2005.

ECCOPAD Metaltag, Read on Metal UHF RFID Tag, Emerson & Cuming Microwave Products, Randolph,, MA, revision Aug. 17, 2007.

\* cited by examiner

VIRTUAL SHORT CIRCUIT FOR PROVIDING REFERENCE SIGNAL IN RFID TAG

RELATED APPLICATIONS

The present non-provisional patent application is related to and claims priority benefit of an earlier-filed provisional patent application titled RADIO FREQUENCY IDENTIFICATION (RFID) ANTENNA TECHNIQUES, Ser. No. 60/750,182, filed Dec. 14, 2005. The identified earlier-filed application is hereby incorporated by reference into the present application.

FIELD OF THE INVENTION

The present invention relates generally to radio frequency identification (RFID) devices, and, more specifically, to a virtual short circuit using a stepped impedance transformation from an open circuit or other known impedance point to provide a reference signal to an integrated circuit in an RFID tag, and methods for making same.

BACKGROUND OF THE INVENTION

RFID devices are used in a variety of different applications, including, for example, monitoring, cataloging, and tracking items. An RFID system typically includes a transponder, or "tag", for storing and transmitting data, an interrogator, or "reader", for receiving the data from the tag, and a data communications network for conveying the data received by the interrogator to an information system.

RFID tags generally have a tag antenna and an integrated circuit (IC). Tag antennas can be constructed from a variety of materials, including silver, copper, and aluminum, and can be printed (e.g., silkscreen, gravure, flexography), etched, stamped, or grown. Tags are "active" if they contain an internal power source, and "passive" if they receive power from an external source such as the interrogator. Battery assisted tags (BATs) are a type of passive tag that uses an internal source to power the IC and an external source to power RF transmission.

In a two-terminal IC, one terminal is connected to the tag antenna, and the other terminal is connected to an electrical reference. In a four-terminal IC, one pair of terminals may be connected to a first dipole antenna, and the other pair of terminals may be connected to a second dipole antenna. Typically, the two dipole antennas are planar and orthogonal in space, which provides polarization and directional diversity.

RFID interrogators have an interrogator antenna, and use radio frequency signals to acquire data remotely from tags that are within range. More specifically, the tag communicates with the interrogator by modulating the scattering parameters of the tag antenna. For example, the IC presents an impedance that is the complex conjugate of the antenna impedance; as a result, half of the RF energy will be delivered to the IC, and half scattered or re-radiated into space. However, a dipole antenna in which the two feed points are shorted is effectively a metal wire of resonant length. RF energy of the resonant frequency induces currents in the resonant wire. Since a wire is an excellent conductor, all RF energy is scattered. By modulating its impedance, the IC of the passive tag is able to change the scattering characteristics of the tag. The interrogator detects this change in the magnitude or phase of the backscattered energy and thereby detects signals from the tag.

RFID systems operate over a range of different frequencies including low frequency (LF), typically around 125-135 KHz, high-frequency (HF), typically around 13.56 MHz, ultra-high-frequency (UHF), typically around 433 MHz to 900 MHz, and microwave radio bands, typically around 2.4 to 5.8 GHz. At LH and HF frequencies, the tag antenna is typically coupled to the interrogator antenna by a magnetic component of a reactive near-field, in which both antennas are configured as coils in a resonant circuit. However, typical antennas used in near-field systems are only a small fraction of a wavelength in their linear dimensions and, therefore, are inefficient electromagnetic radiators and receptors. As a result, the useful range of operation may be limited to as little as a few inches from the interrogator antenna. Such a short read distance is a significant disadvantage in many applications.

At UHF and microwave frequencies, the tag antenna is typically coupled to the interrogator antenna by a radiating far-field, which is an electromagnetic (EM) wave that propagates over distances typically of more than a few wavelengths. As a result, the useful range of operation can be twenty feet or more. However, compared to the HF band, the radiation and reception of EM waves at these higher frequency bands are affected much more strongly by obstacles and materials in the immediate environment of the antennas. In particular, attaching tags to metal objects or containers containing metal or water is problematic.

Many UHF RFID tags are provided with resonant dipole antennas. Dipole antennas have good free-space characteristics and a convenient form factor and are easy to design and manufacture. However, dipole antennas suffer considerable performance degradation when placed near a high-loss and/or high-dielectric material, such as water, or near a conductor, such as metal. This is commonly referred to as the "metal/water problem" and occurs because the dielectric material changes the electromagnetic properties of the antenna, which changes the resonant frequency of the antenna. More specifically, when a dipole antenna is placed near a conductor, the operation of the antenna changes from that of a "free space resonator" to a "volume resonator", which impacts the performance of the antenna in a number of ways. If the antenna is no longer resonant, it becomes less efficient at radiating and receiving RF energy. The bandwidth of the antenna becomes narrower, such that the antenna is only efficient over a much smaller range of frequencies. If the antenna is intended to operate outside of this narrow band, it will suffer degraded performance. Furthermore, as the resonant frequency of the antenna changes, the characteristic impedance of the antenna changes. This further degrades performance by reducing efficient power transfer between the antenna and the IC. Additionally, if the dielectric material is lossy (e.g., water), the dielectric loss further contributes to the degradation of antenna performance. Additionally, if the antenna is very close to metal, the conductive losses of the antenna can become more pronounced, especially when not operating at its resonant frequency. Various solutions to these problems have been proposed, but all suffer from one or more limitations and disadvantages.

Some RFID tags are provided with microstrip antennas. A microstrip antenna is an antenna comprising a thin metallic conductor bonded to one side of a substrate. A ground plane is bonded to the opposite side of the substrate. Microstrip antennas behave primarily as volume resonators, which is fundamentally different from non-microstrip antennas. Generally, a tag incorporating a microstrip antenna also comprises a feed structure and matching circuit. The antenna, feed structure, and matching circuit are designed specifically to operate with the substrate, and the ground plane electrically isolates the antenna from the material to which it is attached.

The IC of the RFID tag requires two input signals: a data signal and a reference signal. The data signal is provided by the antenna, feed structure, and matching circuit. The reference signal can be provided by a physical, short circuit connection to the ground plane. Unfortunately, manufacturing the physical connection to extend through or around the intervening substrate significantly increases the complexity and, therefore, the cost of manufacture. Alternatively, the reference signal can be provided by a quarter wave transmission line transformation from an open circuit to achieve a virtual short circuit for one terminal of the IC, while using a set of three series-connected transmission lines as the matching circuit. Unfortunately, this approach uses space inefficiently, and the bandwidth of the quarter wave transformer tends to be smaller than that of the microstrip antenna, which undesirably limits the useable bandwidth of the tag.

For example, consider a substrate material that is approximately 0.0625 inches thick and has dielectric properties $\epsilon_r=2.41$ and $\tan \delta=0.0035$. A quarter wave transmission line is approximately 1 mm wide and 60 mm long and behaves as a purely short circuit at 915 MHz. However, at 860 MHz the quarter wave transmission line has a substantial negative reactive component (approximately $-j10\Omega$), and at 960 MHz it has a substantial positive reactive component (approximately $j10\Omega$).

SUMMARY OF THE INVENTION

The present invention overcomes the above-described and other problems by providing an RFID tag including a virtual short circuit using a stepped impedance transformation from an open circuit or other known impedance point to provide a reference signal to an IC.

In one embodiment, the stepped impedance transformation of an open circuit, wherein the stepped impedance transformer does not consist solely of a quarter wavelength transmission line. In one embodiment, the impedance transformer consists of first and second transmission lines having different lengths and widths. In one embodiment, the RFID tag also includes an impedance matching circuit that does not consist solely of a three-section transmission line. In one embodiment, the matching circuit includes a shorting stub transmission line.

These and other features of the present invention are described in more detail in the section titled DETAILED DESCRIPTION, below.

BRIEF DESCRIPTION OF THE DRAWINGS

The following drawings form part of the present specification and are included to further demonstrate certain aspects of the present invention. The figures are examples only, and do not limit the scope of the invention.

DETAILED DESCRIPTION

With reference to the figures, an RFID tag 10 is herein described, shown, and otherwise disclosed in accordance with one or more preferred embodiments of the present invention. More specifically, the present invention concerns a virtual short circuit including a stepped impedance transformation from an open circuit or other known impedance point to provide a reference signal to an IC without suffering the space inefficiency and adverse bandwidth effects of existing solutions.

Figure 1:
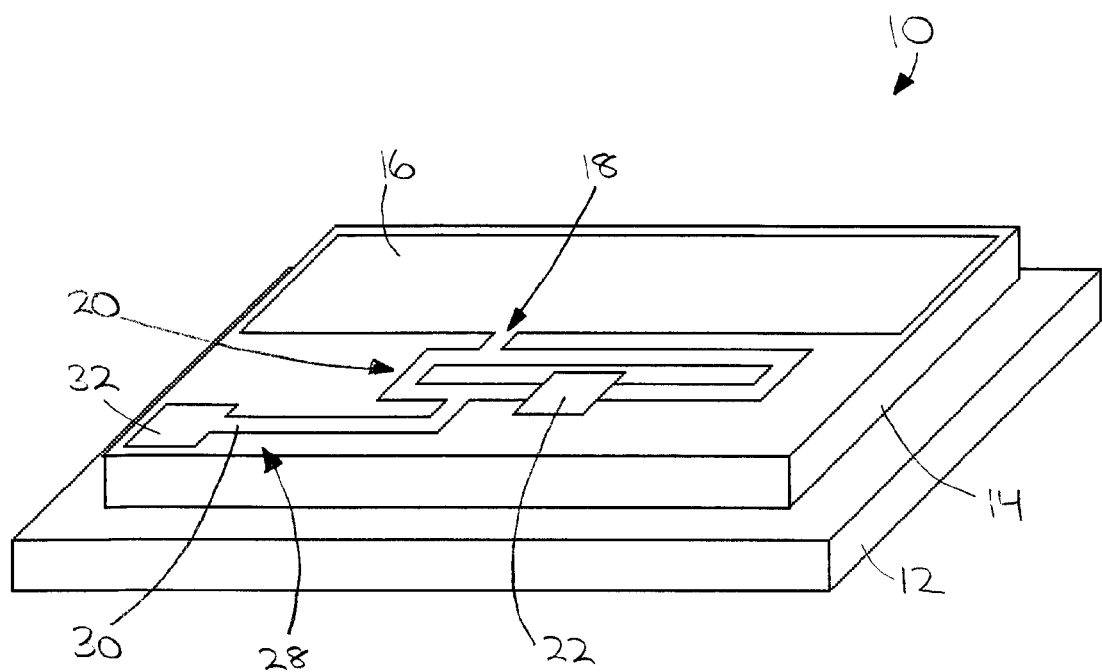
FIG. 1 is an isometric view of an RFID tag in which a virtual short circuit uses a stepped impedance transformation from an open circuit to provide a reference signal to an IC.

Referring to FIG. 1, an RFID tag 10, or "transponder", is shown comprising a ground plane 12, a dielectric substrate 14, a microstrip antenna 16, a feed structure 18, an impedance matching circuit 20, and an IC 22. Use of the microstrip antenna 16 allows the RFID tag 10 to operate on otherwise difficult-to-tag materials such as metal or water. For lower manufacturing cost, the microstrip antenna 16, feed structure 18, matching circuit 20, and IC 22 can all be located on one side of the substrate 14, with the ground plane 12 being bonded to the opposite side of the substrate 14. In one embodiment, the feed structure 18 is attached to a non-radiating edge of the antenna 16. In another embodiment, the feed structure 18 is attached to a slot, or recess, within a radiating edge of the antenna 16.

Figure 2:
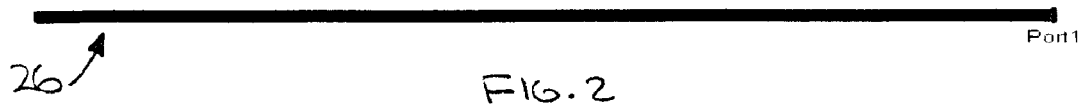
FIG. 2 is plan view of a quarter wavelength transmission line transformer.

The IC 22 requires two input signals: a data signal and a reference signal. The data signal is provided by the antenna 16, feed structure 18, and matching circuit 20. As discussed, the reference signal can be provided by a physical, short circuit connection to the ground plane. Alternatively, as was also discussed, the reference signal can be provided by a quarter wavelength transmission line transformer 26 to achieve a virtual short circuit for one terminal of the IC, as shown in FIG. 2, while using a set of three series-connected transmission lines as the matching circuit. Unfortunately, this approach uses space inefficiently, and the bandwidth of the quarter wave transformer tends to be smaller than that of the microstrip antenna, which undesirably limits the useable bandwidth of the tag.

Figure 3:
FIG. 3 is a plan view of a stepped impedance transformer including first and second transmission lines having different lengths and widths.
Figure 4:
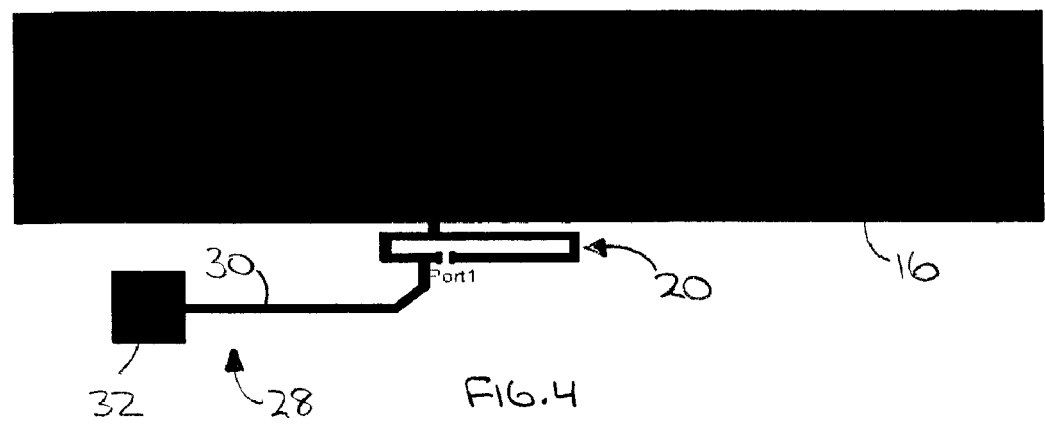
FIG. 4 is a plan view of an RFID tag including the stepped impedance transformer of FIG. 3 and a matching circuit including a shorting stub.

These problems are avoided in present invention by an impedance transformation circuit 28 that is significantly more compact while simultaneously increasing the bandwidth of the quarter wave transformer 26. In one embodiment, the RFID tag 10 further comprises a virtual short circuit using a stepped impedance transformation from an open circuit or other known impedance point, wherein the stepped impedance transformer does not consist solely of a quarter wavelength transmission line. Referring to FIG. 3, in one embodiment, the impedance transformer 28 consists of first and second transmission lines 30,32 having different lengths and widths. In one embodiment, the RFID tag 10 also includes an impedance matching circuit 20 that does not consist solely of a three-section transmission line. Referring to FIGS. 1 and 4, in one embodiment, the matching circuit 20 includes a shorting stub transmission line.

More specifically, referring again to FIG. 3, a stepped impedance transformer 28 is shown including a first transmission line 30 coupled with the antenna 16 and having a first width and a first length, and a second transmission line 32 coupled in series with the first transmission line 30 and having a second width and a second length, wherein the first width is different from the second width and the first length is different from the second length. For example, in an application in which the first transmission line is approximately 1 mm wide and 30 mm long and is coupled in series with the second transmission line which is approximately 10 mm wide and 7.5 mm long, the total length of the resulting stepped impedance transformer is approximately 37.5 mm. This is advantageously approximately 22.5 mm shorter that the transmission line of FIG. 2. Furthermore, the impedance is approximately $-j8\Omega$ at 860 MHz and approximately $-j8\Omega$ at 960 MHz, and, thus, the transformer acts more like a short circuit over a range of frequencies.

Referring again to FIG. 1, the design of FIGS. 3 and 4 is shown incorporated into an RFID tag 10 which includes a substrate material that is $6.25 \times 10^{-2}$ inches thick and has dielectric properties $\epsilon_r=2.41$ and tan $\delta=3.5 \times 10^{-3}$, and in which the impedance matching circuit is able to achieve a perfect conjugate match of $34+j110\Omega$ at resonance. FIG. 4 also shows the shorting-stub matching circuit which is approximately 21 mm long and 4 mm wide, which is considerably more compact than what can be achieved with the aforementioned series-connected, three-transmission-line transformer.

Figure 5:
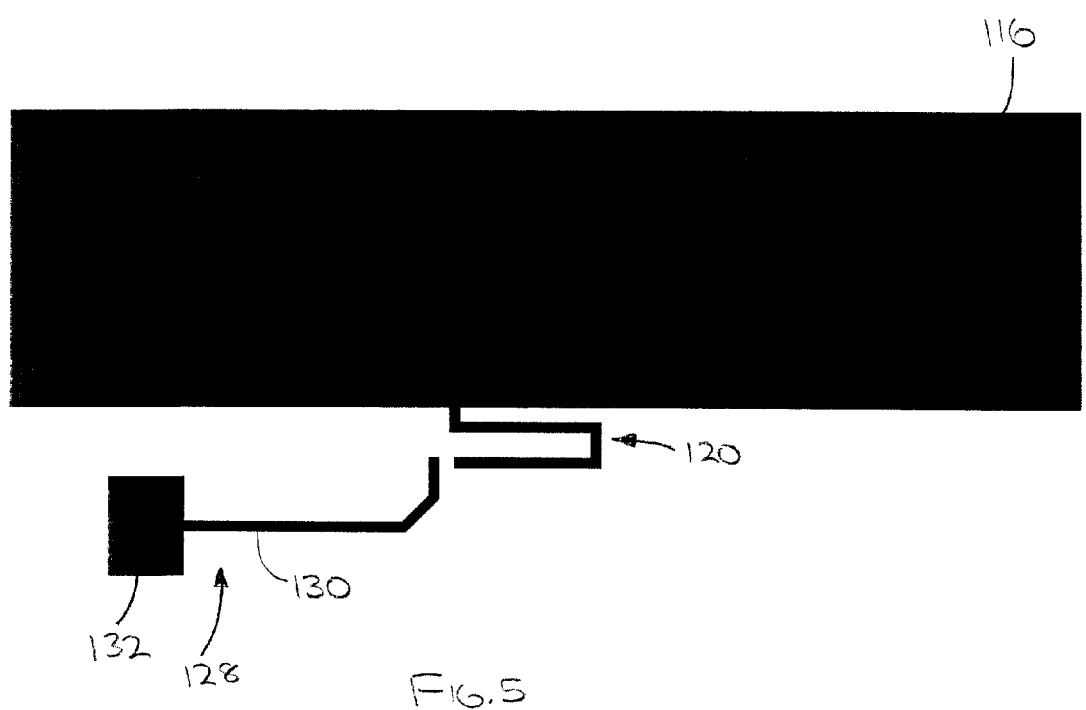
FIG. 5 is a plan view of an RFID tag including an alternative embodiment of the stepped impedance transformer.

Referring to FIG. 5, an alternative embodiment is shown in which the antenna 116 is approximately 106.4 mm long and approximately 30 mm wide, and is constructed on material that is approximately $6.25 \times 10^{-2}$ inches thick and has a dielectric constant of approximately 2.41 and a loss tangent of approximately $3.5 \times 10^{-3}$. The matching circuit 120 comprises a transmission line connecting the antenna 116 to the IC which is approximately 33.5 mm long and approximately 1 mm wide, and the center of the feed is approximately 9 mm from the center of the patch. This transmission line provides the impedance transformation necessary to obtain a conjugate match to the IC. The first transmission line 130 of the impedance transformer 128 is approximately 30.25 mm long and 1 mm wide and is connected to the second transmission line 132 which is approximately 7.5 mm long and approximately 10 mm wide. The first and second transmission lines 130,132 cooperate to provide a virtual short circuit at 915 MHz.

Figure 6:
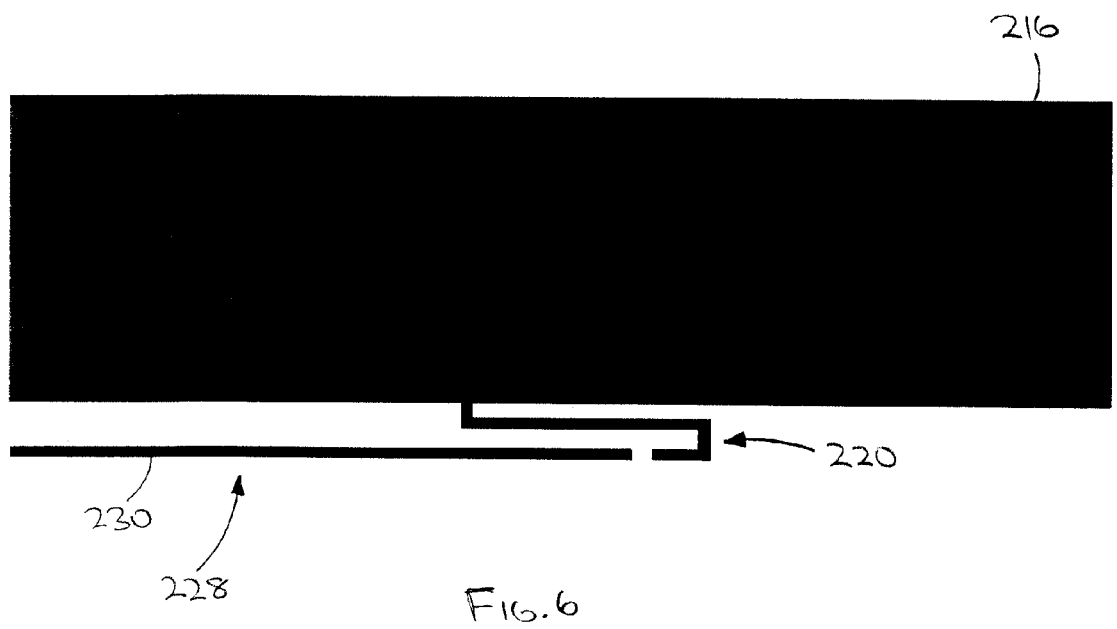
FIG. 6 is a plan view of an RFID tag including an alternative embodiment of the stepped impedance transformer.

Referring to FIG. 6, an alternative embodiment is shown in which the antenna 216 is approximately 106.4 mm long and approximately 30 mm wide, and is constructed on material that is approximately 1.6 mm thick and has a dielectric constant of approximately 2.41 and a loss tangent of approximately $3.5 \times 10 \times 10^{-3}$. The matching circuit 220 comprises a transmission line connecting the antenna 216 to the IC which is approximately 33.5 mm long and approximately 1 mm wide, and the center of the feed is approximately 9 mm from the center of the patch. This transmission line provides the impedance transformation necessary to obtain a conjugate match to the IC. The impedance transformer 228 comprises a single transmission line 230 which is approximately 60 mm long and 1 mm wide and which provides a virtual short circuit at 915 MHz.

All of the apparatuses and methods disclosed and claimed herein can be made and executed without undue experimentation in light of the present disclosure. While the present invention has been described in terms of particular embodiments, it will be apparent to those of ordinary skill in the art that variations can be applied to the methods and in the steps or in the sequence of steps of the method described herein without departing from the concept, spirit, and scope of the invention. All such similar substitutes and modifications apparent to those skilled in the art are deemed to be within the spirits, scope, and concept of the disclosure as defined by the appended claims.

The invention claimed is:

1. A radio frequency identification transponder comprising:
   a microstrip antenna;
   an integrated circuit;
   an impedance matching circuit coupling the microstrip antenna with the integrated circuit; and
   a stepped impedance transformer from a known impedance point for providing a reference signal to the integrated circuit, the stepped impedance transformer including
      a first transmission line coupled with the antenna and having a first width and a first length, and
      a second transmission line coupled in series with the first transmission line and having a second width and a second length,
      wherein the first width is different from the second width and the first length is different from the second length.

2. The radio frequency identification transponder as set forth in claim 1, wherein the known impedance point is an open circuit.

3. The radio frequency identification transponder as set forth in claim 1, wherein the first width is greater than the second width and the first length is less than the second length.

4. The radio frequency identification transponder as set forth in claim 1, wherein the matching circuit is not a three-section microstrip circuit.

5. The radio frequency identification transponder as set forth in claim 1, wherein the matching circuit includes a shorting stub matching circuit.

6. The radio frequency indentification transponder as set forth in claim 1, wherein the matching circuit consists of a single transmission line.

7. In a radio frequency identification transponder for physical association with an object and for storing and communicating data about the object, the radio frequency identification transponder having a microstrip antenna, an integrated circuit, and an impedance matching circuit coupling the microstrip antenna with the integrated circuit, the improvement comprising:
   a stepped impedance transformer from a known impedance point for providing a reference signal to the integrated circuit, the stepped impedance transformer including
      a first transmission line coupled with the antenna and having a first width and a first length, and
      a second transmission line coupled in series with the first transmission line and having a second width and a second length,
      wherein the first width is different from the second width and the first length is different from the second length.

8. The radio frequency identification transponder as set forth in claim 7, wherein the known impedance point is an open circuit.

9. The radio frequency identification transponder as set forth in claim 7, wherein the first width is greater than the second width and the first length is less than the second length.

10. The radio frequency identification transponder as set forth in claim 7, wherein the matching circuit is not a three-section microstrip circuit.

11. The radio frequency identification transponder as set forth in claim 7, wherein the matching circuit includes a shorting stub matching circuit.

12. A radio frequency identification transponder comprising:
   a microstrip antenna;
   an integrated circuit;

an impedance matching circuit coupling the microstrip antenna with the integrated circuit, wherein the impedance matching circuit is not a three-section microstrip circuit; and a virtual short circuit from a known impedance point for providing a reference signal to the integrated circuit, the virtual short circuit including a stepped impedance transformer that is not a quarter wavelength transmission line.

13. The radio frequency identification transponder as set forth in claim 12, wherein the known impedance point is an open circuit.

14. The radio frequency identification transponder as set forth in claim 12, wherein the stepped impedance transformer includes a first transmission line coupled with the antenna and having a first width and a first length, and a second transmission line coupled in series with the first transmission line and having a second width and a second length, wherein the first width is different from the second width and the first length is different from the second length.

15. The radio frequency identification transponder as set forth in claim 14, wherein the first width is greater than the second width and the first length is less than the second length.

16. The radio frequency identification transponder as set forth in claim 12, wherein the matching circuit is not a three-section microstrip circuit.

17. The radio frequency identification transponder as set forth in claim 12, wherein the matching circuit includes a shorting stub matching circuit.

18. In a radio frequency identification transponder for physical association with an object and for storing and communicating data about the object, the radio frequency identification transponder having a microstrip antenna, an integrated circuit, and an impedance matching circuit coupling the microstrip antenna with the integrated circuit, the improvement comprising:

the impedance matching circuit is not a three-section microstrip circuit; and a virtual short circuit from a known impedance point for providing a reference signal to the integrated circuit, the virtual short circuit including a stepped impedance transformer that is not a quarter wavelength transmission line.

19. The radio frequency identification transponder as set forth in claim 18, wherein the known impedance point is an open circuit.

20. The radio frequency identification transponder as set forth in claim 18, wherein the stepped impedance transformer includes a first transmission line coupled with the antenna and having a first width and a first length, and a second transmission line coupled in series with the first transmission line and having a second width and a second length, wherein the first width is different from the second width and the first length is different from the second length.

21. The radio frequency identification transponder as set forth in claim 20, wherein the first width is greater than the second width and the first length is less than the second length.

22. The radio frequency identification transponder as set forth in claim 18, wherein the matching circuit includes a shorting stub matching circuit.

* * * * *